United States Patent
Day et al.

(10) Patent No.: US 8,931,087 B1
(45) Date of Patent: Jan. 6, 2015

(54) RECONFIGURABLE VIRTUALIZED REMOTE COMPUTER SECURITY SYSTEM

(75) Inventors: Christopher Wayne Day, Miami Beach, FL (US); Robert Lee Rounsavall, II, Coral Springs, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 968 days.

(21) Appl. No.: 12/559,644

(22) Filed: Sep. 15, 2009

Related U.S. Application Data (60) Provisional application No. 61/119,488, filed on Dec. 3, 2008.

(51) Int. Cl.
*H04L 29/06* (2006.01)

(52) U.S. Cl.
USPC .............................. 726/22; 726/23

(58) Field of Classification Search
CPC .............. H04L 63/20; H04L 63/1441; G06F 2009/4557
USPC ...................... 726/22, 23; 713/201
See application file for complete search history.

(56) References Cited

U.S. PATENT DOCUMENTS

| | | | |
|---|---|---|---|
| 2003/0004688 A1* | 1/2003 | Gupta et al. | 702/188 |
| 2003/0188189 A1* | 10/2003 | Desai et al. | 713/201 |
| 2006/0090136 A1* | 4/2006 | Miller et al. | 715/734 |
| 2007/0106622 A1* | 5/2007 | Boomershine et al. | 705/400 |
| 2007/0174429 A1* | 7/2007 | Mazzaferri et al. | 709/218 |
| 2007/0192863 A1* | 8/2007 | Kapoor et al. | 726/23 |

OTHER PUBLICATIONS

Zhou, C.V.; Karunasekera, S.; Leckie, C.; , "Evaluation of a Decentralized Architecture for Large Scale Collaborative Intrusion Detection," Integrated Network Management, 2007. IM '07. 10th IFIP/IEEE International Symposium on , vol., no., pp. 80-89, May 21, 2007—Yearly 25 2007.*

Karl Aberer, Manfred Hauswirth, and Ali Salehi. 2006. A middleware for fast and flexible sensor network deployment. In Proceedings of the 32nd international conference on Very large data bases (VLDB '06), Umeshwar Dayal, Khu-Yong Whang, David Lomet, Gustavo Alonso, Guy Lohman, Martin Kersten, Sang K. Cha, and Young-Kuk Kim (Eds.). VLDB Endowment.*

* cited by examiner

*Primary Examiner* — Victor Lesniewski
*Assistant Examiner* — Syed Zaidi (57) ABSTRACT

Computer-implemented systems and methods are provided for performing computer network security operations with respect to a computer networked environment. A system and method can include deploying a computer network security apparatus at a company's location. A virtualization environment is provided for the computer network security apparatus to allow new configurations to be downloaded to the computer network security apparatus after it has been deployed.

17 Claims, 12 Drawing Sheets

RECONFIGURABLE VIRTUALIZED REMOTE COMPUTER SECURITY SYSTEM

CROSS-REFERENCE TO RELATED APPLICATION

This application claims priority to and the benefit of U.S. Application Ser. No. 61/119,488 (entitled "Remote Network Security Systems and Methods" and filed on Dec. 3, 2008) of which the entire disclosure (including any and all figures) is incorporated herein by reference.

TECHNICAL FIELD

This document relates generally to computer-implemented security operations and more particularly to remote security operations for network and computer systems.

BACKGROUND

Many different security tools exist to help a company confront attacks upon its network and computer systems. The security tools have evolved to keep pace with the ever varying types of attacks. One such tool is an intrusion detection and prevention program. An intrusion detection and prevention program can be configured to automatically (or with some manual involvement) detect when a company's network system and/or computer system is under attack and can attempt to counter the attack.

Because of the complexity and variety of security tools, companies have established Security Operations Centers (SOCs) to manage and operate these tools. A company's SOC is tasked with having a thorough understanding of the security tools and the many different types of attacks that can occur upon the company's network and computer systems. Alternatively, companies may outsource this IT security service to a third party. This option helps lower a company's IT management costs and allows the company to focus on its core business.

SUMMARY

In accordance with the teachings provided herein, systems and methods for operation upon one or more data processing devices are provided to perform computer network security operations with respect to a computer networked environment. As an example of a system and method, a system and method can include deploying a computer network security apparatus at a company's location. A virtualization environment is provided for the computer network security apparatus to allow new configurations to be downloaded to the computer network security apparatus after it has been deployed.

As another example, an apparatus can be configured to perform computer network security operations with respect to a computer networked environment. The apparatus includes one or more computer network interfaces to acquire data related to the computer networked environment and to exchange data with a remote location. A computer-readable storage medium is included for storing a virtualization environment and for storing a configuration of one or more network security data collector programs. The apparatus can also include one or more data processors upon which the virtualization environment and the one or more network security data collector programs execute. The one or more network security data collector programs generate computer network security analysis data. The virtualization environment facilitates the downloading from the remote location of a reconfiguration with respect to the one or more network security data collector programs. The reconfiguration with respect to the one or more network security data collector programs allows different computer network security analysis data to be generated and stored in the computer-readable storage medium.

DETAILED DESCRIPTION

Figure 1:
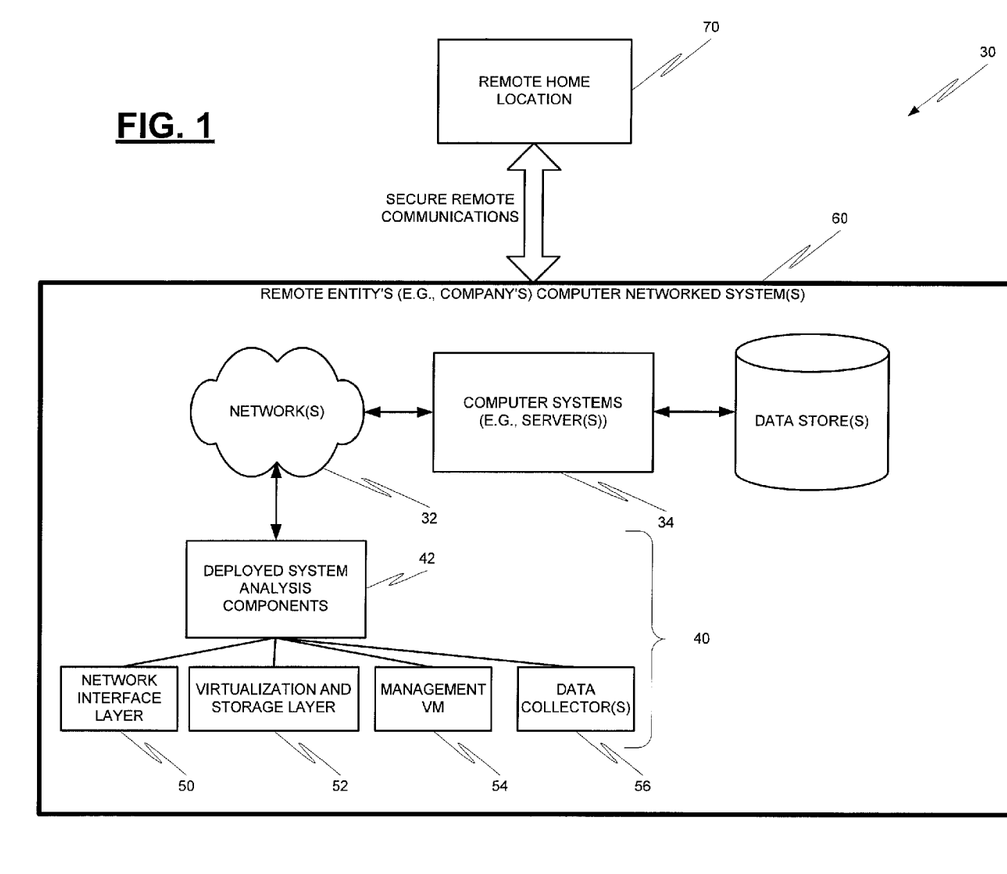
FIG. 1 is a block diagram depicting an environment wherein a remote home location can interact with a deployed computer security analysis box.

FIG. 1 depicts at 30 a computer-implemented system for facilitating remote security operations for network systems 32 and computer systems 34. A remote security operations system 30 can be configured in many different ways, such as to provide immediate visibility and security instrumentation to an entity's (e.g., company's) network systems 32 and computer systems 34. The remote security operations system 30 can include a multi-use tool 40 that is flexible enough to solve multiple network or security problems depending on the needs of the client. Several examples of the security uses for the system 30 could be as follows:

Incident response
Remote Forensics
Vulnerability Assessment
Network Analysis and Trending
Validation of current network security infrastructure The system 30 can be configured for rapid deployment with one or more of the aforementioned capabilities (or other capabilities as needed by the situation at hand). The system 30 can be rapidly deployed because the system does not require a full design/requirements analysis cycle before being deployed at the customer site. The system obviates this requirement by deploying an apparatus (e.g., a box/unit 40) that not only contains computer network analysis software programs, but also includes virtualization technology as shown at 52. Virtualization technology provided with the box 40 allows new configurations to be seamlessly and quickly downloaded to the box 40 after it has been deployed. In addition to the virtualization technology, the box 40 can also be configured to include such components 42 as a network interface layer 50, management VM software 54, and one or more data collectors 56.

With the system 30, companies no longer are required to establish their own costly and time consuming Security Operating Center (SOC). A company just adds the box components 42 of the system 30 into the network, and from a remote home location 70, security analysts securely access the box 40, working as if they are on the customer's premises.

Figure 2:
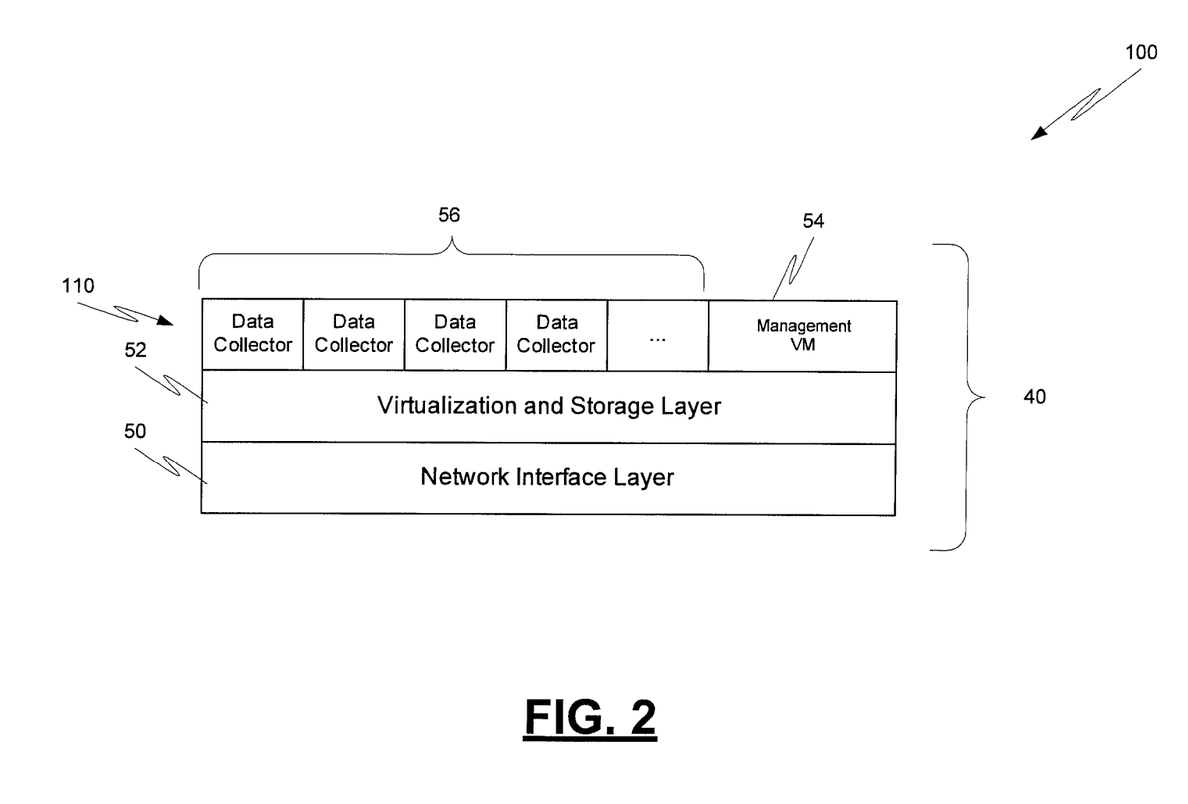
FIG. 2 is a block diagram depicting an example of components in a deployed box being arranged in a layered manner.

The components 42 can be arranged in a layered manner, such as shown at 100 in FIG. 2. The network interface layer 50 includes multiple networks, such as the following three networks. One network is where client span/tap traffic is received and routed. The second network is a private management network that allows intra-virtual machine (VM) communication and communication between other devices in the system. The third network is the network that can be connected to the client site for scanning and testing as well as external connectivity. This layer can communicate via wireless or other ways with components within the company's networked environment.

The virtualization and storage layer (VS) layer 52 manages the private and client facing network. It also stores different virtual appliances, forensic toolsets and analysis engines that allow the system to solve different problems. It can include a cluster of virtual servers and a network attached storage device. The layer can include management VM software 54, such as VMware® ESX. VMware® ESX abstracts server processor, memory, storage and networking resources into multiple virtual machines.

The data collection and management layer 110 includes one or more virtual appliances that allow for data collection (e.g., through data collectors 56) and remote access/management 54 of the system 30. These data collectors 56 can include log aggregators, data flow aggregators and full network traffic recorders. Example data collectors 56 in the layer 110 can include the following functions:

Intrusion Detection and Prevention—The system has on board multiple commercial and open source IDS tools. This allows the a remote Security Operations Center to validate if existing IDS/IPS tools are working correctly. Rulesets are validated and events are verified. The goal is to make sure that the client's existing systems are seeing the same thing that the system is seeing. Remote SOC analysts can assist the client in updating their ruleset or tuning their equipment so that they are seeing the proper alerts.

Vulnerability Scanning—Environments with custom applications and devices can be sensitive to heavy scans and attacks. Inexperienced people could inadvertently bring down critical systems. The security engineers have experience working in these environments and choose tools depending on the environment. They also tread lightly so that critical systems are not brought down. Multiple commercial and open source tools running on virtual appliances within the system allow for effective scanning of all sorts of environments such as Web Application, Database, and Storage.

Network Traffic Pattern Behavior Analysis—Intrusion Detection Systems and Vulnerability Scanning systems are only able to detect well-known vulnerabilities. A majority of enterprises have these systems as well as log aggregation systems but are unable to detect 0-day threats and other previously compromised machines. The answer to this problem is network traffic pattern behavior analysis using flow-based data. Network traffic pattern data shows all connections into and out of the network. If a system is compromised, this data will show the anomalous traffic even if it bypasses the IDS.

Full Network Traffic Capture and Replay—Intrusion detection systems and network behavior analysis systems are valuable pieces to network security and troubleshooting but if there is a compromised system, it is important to be able to determine what has come in and left the network. A way to be more certain about what has left the network is with full packet capture devices. With full packet capture devices, SOC analysts are able to verify whether or not the alerts and patterns that they are seeing are false positives or not. This allows the SOC to quickly tune the system and immediately get results.

Malware Analysis—Reverse engineering is important when determining what capabilities a piece of malware or other suspicious binary that is on an infected system has. Whether or not a piece of malware on an infected database server has the capability to send out information and get in to the data can mean the difference between just an infected server and reporting to the securities exchange commission that an organization just lost thousands of pieces of financial data to an attacker. The system contains virtual appliances that facilitate rapid malware analysis. Many times organizations are not comfortable sending out infected systems because of sensitivity or legal requirements. The client can upload a piece of malware to a system and security experts can immediately reverse engineer the malware and determine capabilities, call back addresses, and any other critical information that can be used to take action at the customer site.

Remote Forensics—The system can include remote forensics capabilities. Once on a site, a client can physically connect a hard drive from an infected machine to a connector on the system and it can be quickly and easily imaged and forensics can be performed without having to ship a drive and without data leaving the client site. Both commercial and open source forensics tools are used by experienced forensic examiners.

The box 40 has the ability to be completely passive on the network and connect out of band. It can use a separate network connection and set up a VPN back to the security operations center or it can use a mobile wireless card to enable remote access. All of the data and processing takes place on the system so a large amount of bandwidth is not needed to access the unit.

As discussed above, the box 40 can be deployed with a pre-specified suite of security products. After the box 40 is installed at the customer's site (e.g., the box 40 is plugged into the customer's network(s) 32), the box 40 connects to the remote home location 70, thereby allowing the remote home location 70 to manage all of the VMs that are in the box 40.

Figure 3:
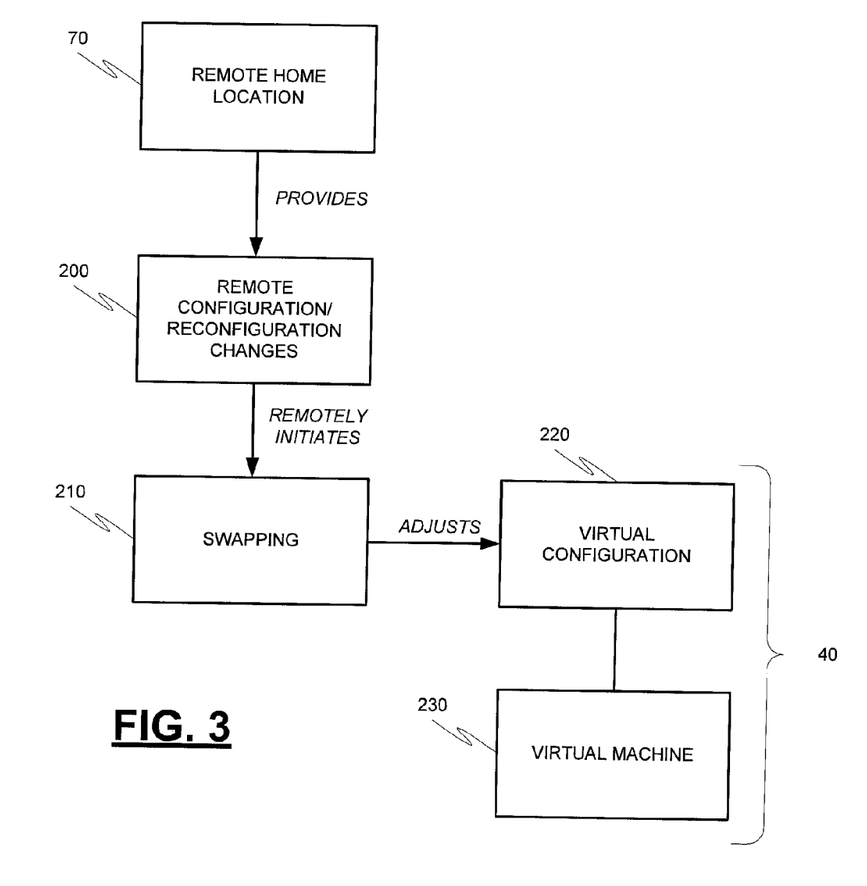
FIG. 3 is a block diagram depicting a remote home location providing remote configuration/reconfiguration changes to a deployed box.

As shown in FIG. 3, the remote home location 70 can provide remote configuration/reconfiguration changes 200 to the box 40 while the box 40 is in the field (e.g., operating at the client's site). As shown at 210, this allows for swapping of software that results in remotely modifying the virtual configuration 220 of a box's virtual machine 230.

Figure 4:
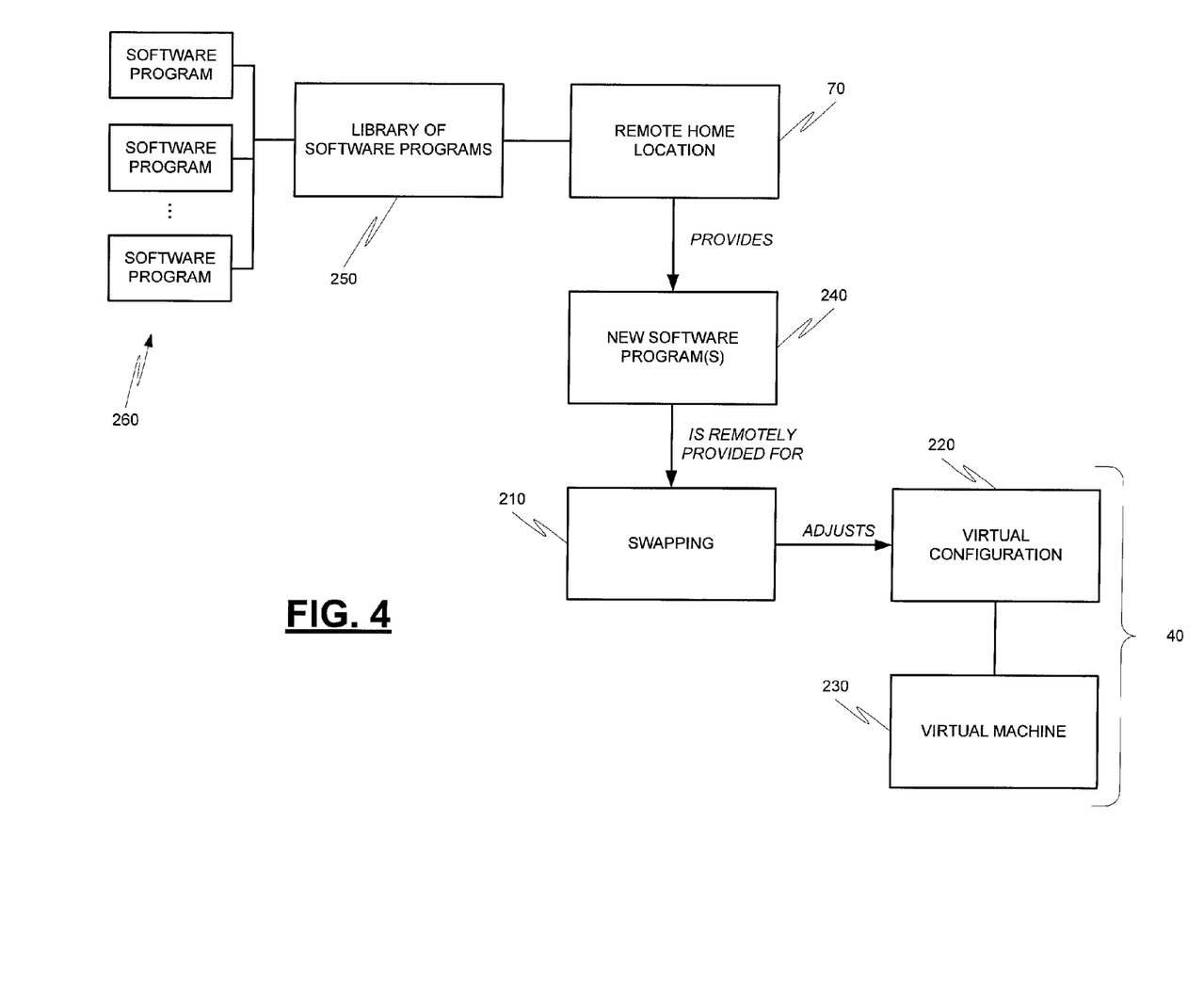
FIG. 4 is a block diagram depicting a remote home location having a library of software programs that can be downloaded to a deployed box.

As another illustration of a remote reconfiguration of the box 40, FIG. 4 depicts a remote home location 70 having an entire library 250 of software programs 260 that can be downloaded to the box 40. Because the box 40 does not have unlimited storage capability, the box 40 can contain only a finite number of security-related programs. However with the virtualization capability provided with the box 40, the box 40 can, in real-time or in near real-time, be remotely reconfigured with new software program(s) 240 from the library 250 that are better suited to address the situation at hand. This obviates the need to have a prior and overly-exhaustive and time-consuming requirements analysis of the customer site (which might take weeks or months). Accordingly, entirely different programs might be swapped out if a new type of security threat has been detected as well as new software versions that might need to be downloaded to the box 40, This capability allows a rapid deployment (e.g., less than 24 hours or 48 hours) to occur at a customer's location. For example, if one or more of the software programs that are initially deployed with the box 40 at a customer site are not found suitable to address the customer's requirements or the problems associated with the customer's site change, then a new VM (i.e., a reconfigured virtual machine 230) can be deployed from the remote home location 70 that contains software 240 suitable to address such requirements or problems.

As another example, the mission of the deployed box 40 may change over time. The remote home location 70 can avoid costly and time-consuming physical visits to the customer site for reconfiguring the box 40 to match the evolving mission and instead can remotely reconfigure the box 40 by shutting down the old VM or VMs and starting up the new VM or VMs that are better suited for the new mission. In this respect, the VMs that are contained in the box 40 are task-specific and can be dynamically re-mapped within the box 40. Additionally, if a new software program requires a different operating system (e.g., Solaris® instead of Windows®), then a new box does not need to shipped to the customer's site. Instead because of the virtualization environment, the new operating system can be remotely supplied to the box 40 in order for that particular security software program to run. In this respect, the deployment approach can handle more risk that the initially-deployed box does not contain all of the software programs that may be needed at the customer's site since the box 40 can be easily reconfigured remotely via the remote home location 70 at a later time. Additionally, when the box 40 is being used to solve a network security crisis, programs (that might not have been considered needed when the box 40 was initially deployed) can be seamlessly downloaded in real-time or near real-time to the box 40 to provide additional analysis that did not previously exist in the box 40.

From a company's perspective, the reconfiguration feature allows a company to be more holistic with respect to their security operations. For example, instead of a company being constrained to having only a select few security products because of its IT budget, the company now can utilize whatever programs suit their security needs as they change over time. If a particular program is no longer needed and should be replaced by another program in order to detect a different type of security situation, then the two programs can be swapped, and the company does not have to pay for the software program that it does not need, but only pays for the programs that truly suit its needs.

Figure 5:
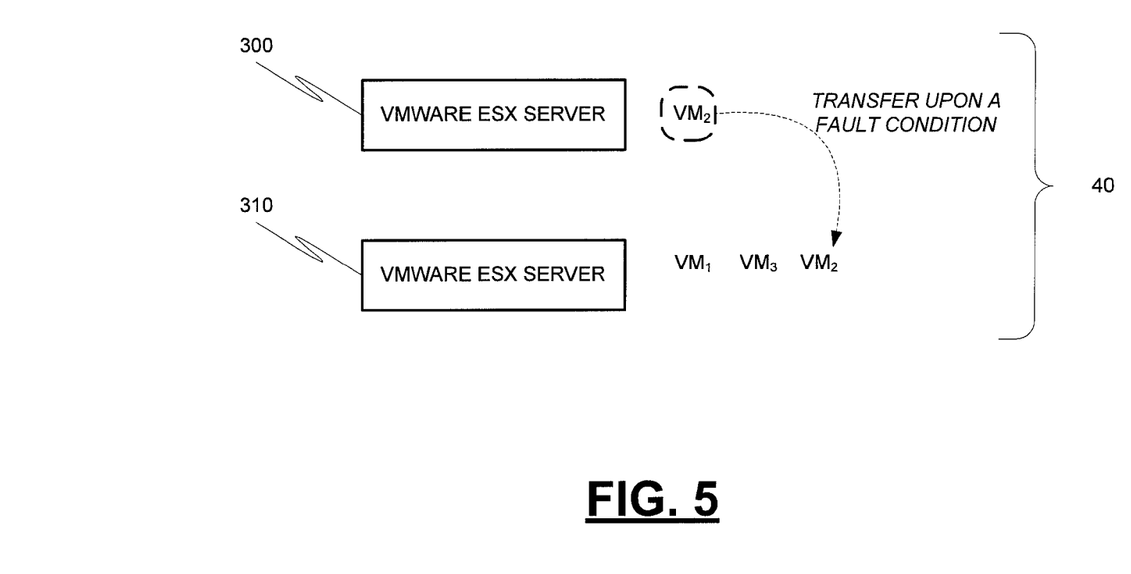
FIG. 5 is a block diagram depicting the handling of a fault within a deployed box.

With respect to fault tolerance and as illustrated in FIG. 5, if a box 40 determines that a blade 300 in the box 40 is about to go into a fault condition, the box 40 can move VMs (e.g., $VM_2$) over to another blade (e.g., blade 310) that is in the box 40, and start shutting down the defective blade 300. Software products, such as VMotion from VMware, Inc (which is based in Palo Alto, Calif.) can facilitate this by allowing for the migration of operational virtual machines between similar but separate hardware hosts that share the same storage. This capability allows the box 40 to continue in full operational capability albeit in a degraded performance mode. Additionally, this capability reduces the need for an immediate physical visit by a technician to the customer site in order to address the defective blade. It should be noted that physical visits to a customer site can be difficult, especially if the customer site is a top-secret government facility or is in a foreign country.

Figure 6:
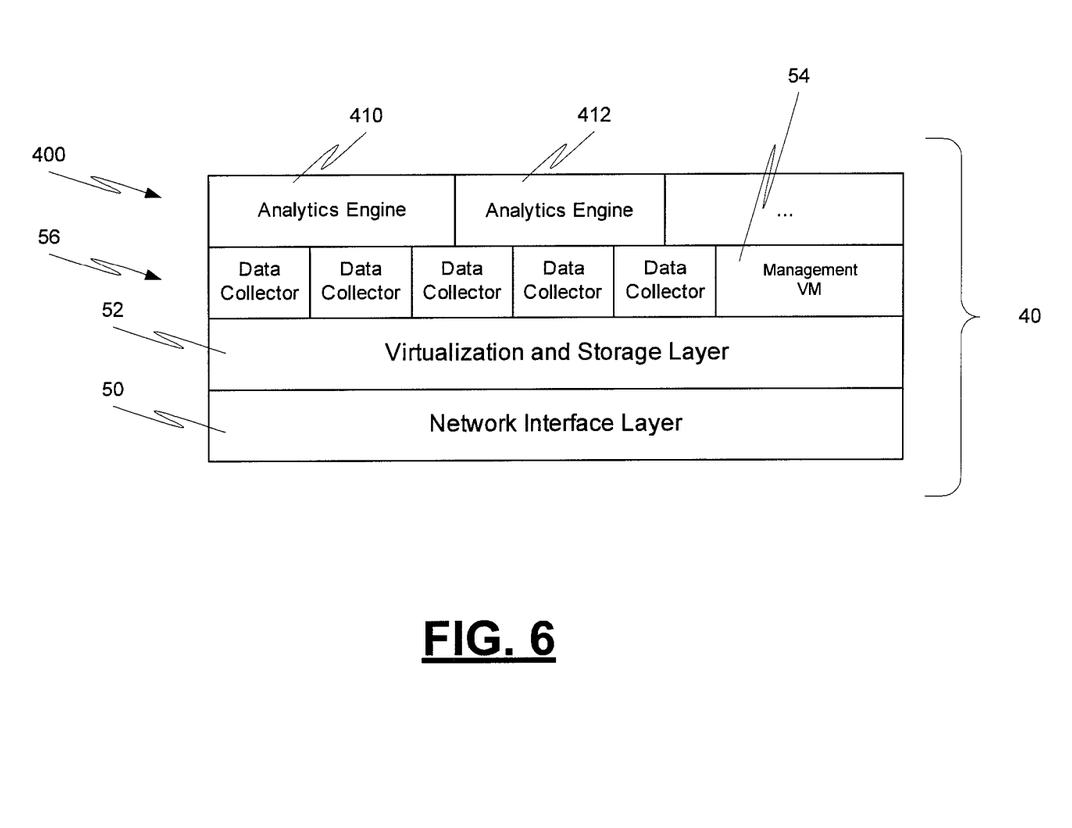
FIG. 6 is a block diagram depicting an example of components in a deployed box having an analytics engine layer.

A box 40 can be configured to have other capabilities, such as data fusion. As shown in FIG. 6, the box 40 can be configured to allow data from disparate security software to be analyzed together, thereby providing a more holistic analytic framework for assessing network security issues. To synthesize data from disparate data collectors within layer 56, one or more analytic engines (e.g., analytic engines 410 and 412) in layer 400 can reside within the box 40 to perform the data fusion and analysis.

The analytics layer 400 can include different virtual and physical appliances and analytics engines (AEs) to solve different security and network problems. The analytics layer 400 is where tools like IDS/IPS can reside as well as remote forensics and remote malware analysis capabilities.

A data collector in layer 56 may analyze network behavior (e.g., session packet traffic) and provide a vast number of metrics associated with the traffic (e.g., packet size, destination and source information, etc.). Such metrics can then be funneled into an analytics engine 410 (e.g., an Activeworx analysis program). Such programs can examine a class of sessions and derive statistical profiles that identify security-related problems. This can facilitate the detection of subsequent security-related problems that match the derived statistical profiles For example a particular session packet profile (e.g., a significantly above-average packet size) coupled with a particular source and destination can be used by an analytics engine 410 to indicate a security-related problem. As another example of an operational scenario, if a data collector detects that traffic is from a suspect source, an analytics engine 410 can be configured to automatically retrieve information from a different type of data collector that analyzes a different network aspect (e.g., the actual conversation that is occurring between the two computer systems). Based upon the analysis by the analytic engine 410, the session between the two computer systems can be automatically terminated or the remote home location can be contacted for further investigation and reporting to the client company. It should be understood that similar to the other processing flows described herein, the steps and the order of the steps in these operational scenarios may be altered, modified, removed and/or augmented and still achieve the desired outcome. Additionally, a multiprocessing or multitasking environment could allow two or more steps to be executed concurrently.

Figure 7:
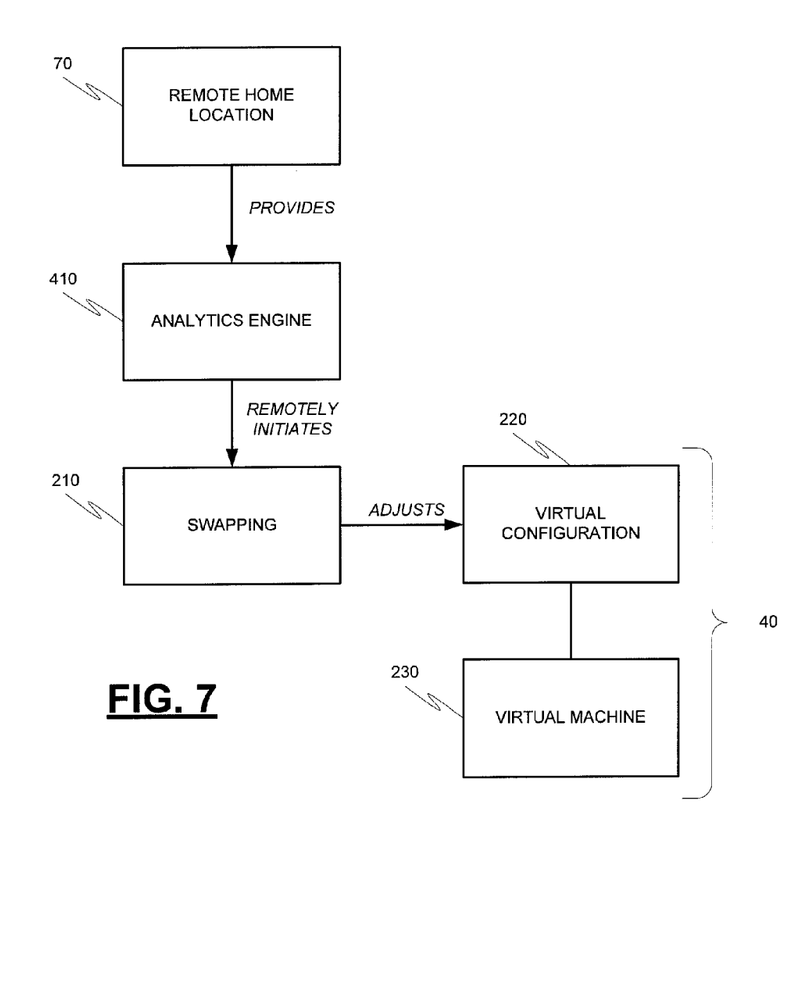
FIG. 7 is a block diagram depicting an analytic engine being downloaded or reconfigured remotely.

Because of the virtualization environment and integrated networking and storage, an analytic engine 410 can be downloaded from or reconfigured remotely by the remote home location 70 as shown in FIG. 7. For example, a particular analytic engine (e.g., analytic engine 410) could have been initially designed to capture information from two of the data collectors. After additional analysis of historical data, problem detection can be enhanced if data from a third data collector can also be used by the analytic engine 410 to supplement the data from the first two data collectors. This new configuration (i.e., which specific data collectors should be used with the analytic engine 410) can then be used to remotely reconfigure other boxes for the company and/or other companies with which the remote home location is in data communication.

Still further, the ability to download and use different data collectors 56 and analytic engines 400 can reduce or eliminate the need for sensitive data of the company from leaving the box 40 and traveling to a remote location. For example, if a box 40 is deployed within a healthcare company, the additional analytic capability provided by an analytic engine 410 can eliminate the need for the company sensitive data (e.g., patient health data, passwords, word processing documents, etc.) to be sent to a remote location for more sophisticated analysis. As another example, a company may not even wish that the fact that an alert has been detected should be sent to a remote location. Because the box 40 has increased sophisticated analytic and processing capabilities, the alert can not only be detected by the box 40 but handled.

Figure 8:
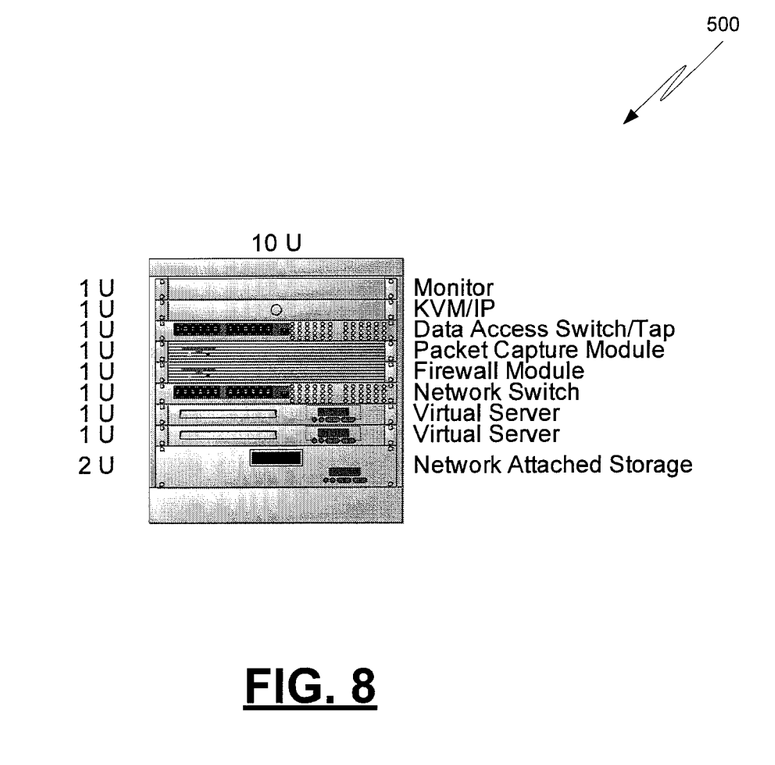
FIG. 8 depicts an example of box components which can be shipped in a portable rack.
Figure 9:
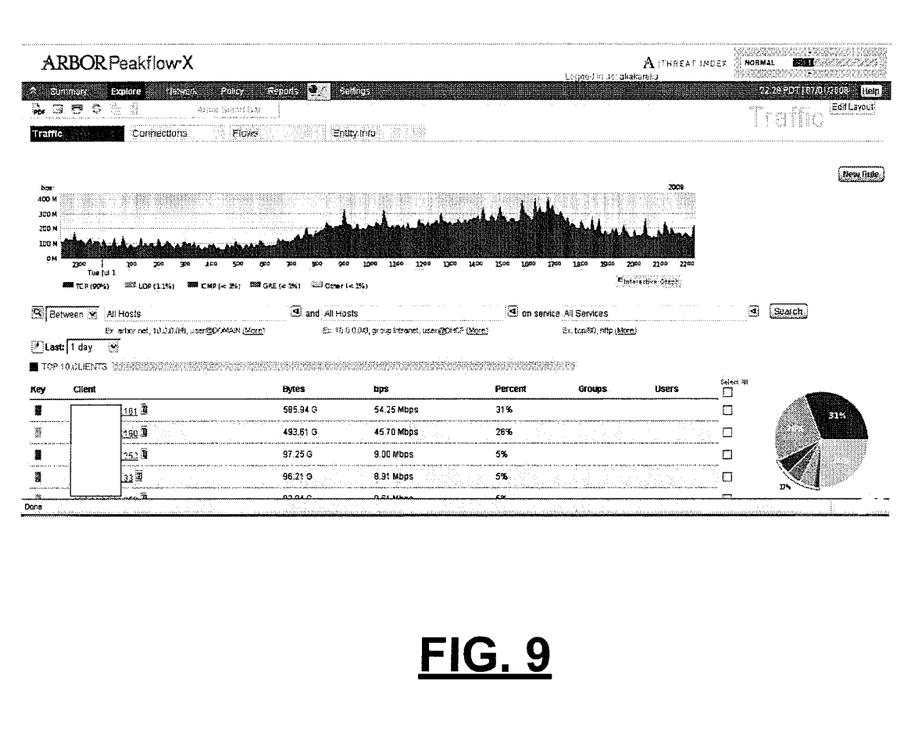
FIGS. 9-11 are screen shots from computer security tools.
Figure 10:
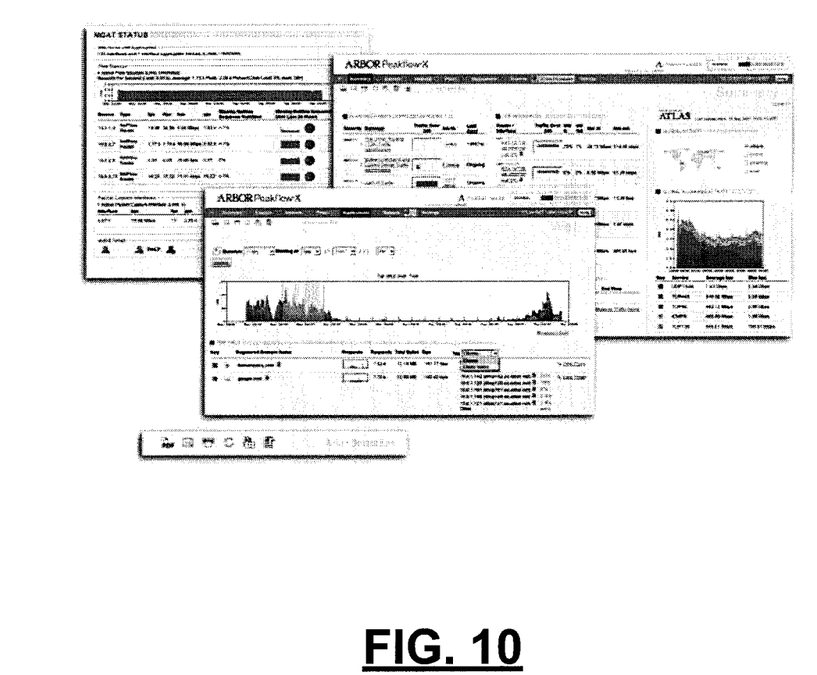
Figure 11:
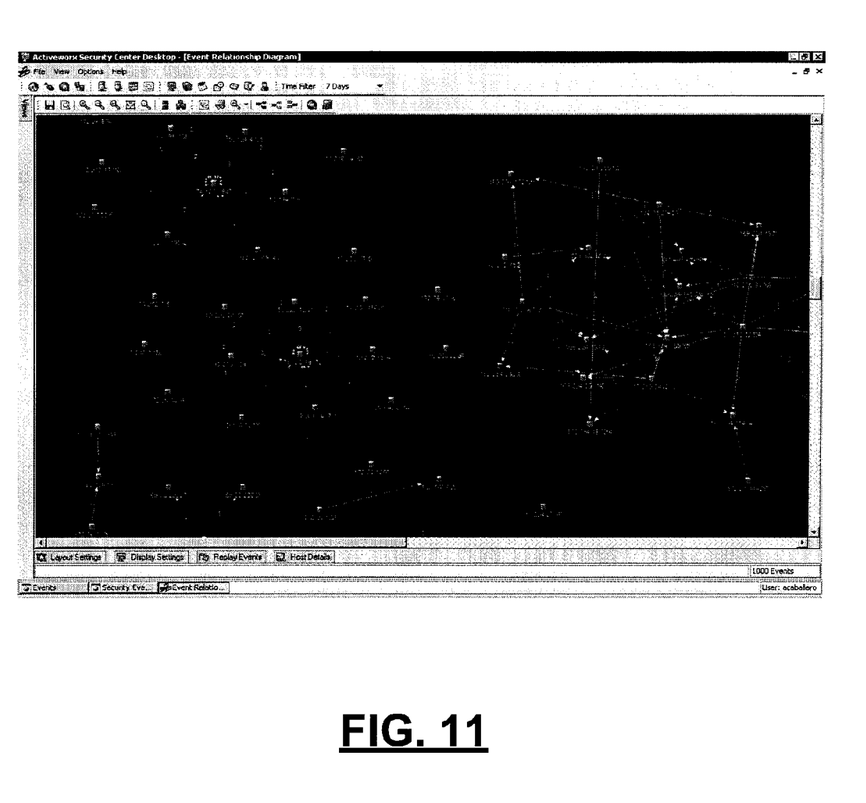

FIG. 8 depicts an example of a box components 500 which can be shipped in a portable rack (e.g., whose size is 6 U and 10 U in size) and can be on site and up and running between twelve and forty-eight hours depending on location. Once on site, the box 40 is connected to the client network in a passive manner and then connects back to a remote home location (e.g., a remote Security Operations Center (SOC)) that is manned 24×7 with people skilled in the security field. The stack of gear covers a wide range of technologies and fills in any gaps that might exist in a client's security architecture. As an example of box components 500, the following can be used:

Cisco Switch
VMWare ESX Server
Unix and Windows Based Servers
Gigamon Data Access Switch
FortiGate Firewall and IDS/IPS
Snort IDS/IPS
Arbor Peakflow Behavior Monitor
Niksun Full Packet Capture Appliance
Linux and Windows Servers
Activeworx SIEM and Log Aggregation Tools In this example, the box components 500 include the Arbor Peakflow Behavior Monitor and the Activeworx SIEM and Log Aggregation Tools. (It should be understood that additional programs or programs other than the Arbor PeakFlow Behavior Monitor and the Activeworx tools can be used as box components 500.) FIGS. 9-11 depict example analysis screens whose data can be generated and sent to a remote home location by the Arbor PeakFlow Behavior Monitor and the Activeworx tools which are contained in the box 40.

In today's networked world, the financial performance of an enterprise hinges on the operational performance of its network. With its network visibility capability and real-time threat detection, the Arbor Peakflow X solution optimizes the performance and security of today's largest enterprise networks—including those based on multiprotocol label switching (MPLS). As illustrated in FIGS. 9 and 10, Peakflow X constructs a system-wide view of enterprise networks, auto-learning host behaviors to determine who talks to whom—and how. It enables a company to address a wide range of internal and external threats while maintaining business continuity. In addition to the real-time security information of Arbor's Active Threat Feed (ATF) service, Peakflow X also integrates data from Arbor's Active Threat Level Analysis System (ATLAS)—providing contextualized threat intelligence from a global and local perspective.

Activeworx is a real-time security monitor, log aggregator, and SIEM product that allows for advanced forensic analysis, as well as storage of log data from many different devices. Activeworx has the ability to collect log data from devices such as firewalls, IDS systems, Windows Servers, and any device able to generate syslog logs or SNMP traps. The Activeworx Manager is a modular application that provides the following functions which can be included as box components 500:

Data collection
Event normalization and correlation
Alert notification
Data storage
Scheduling of reports and data functions
Granular security The following types of Activeworx Manager modules are also available for use as box components 500:

Network Collector: Collects all Syslog UDP/TCP and SNMP v1-3
Winlog Collector: Communicates with Windows servers via DCOM\WMI services and requests Windows event log messages
Checkpoint Collector: Used to communicate with Checkpoint firewalls via OPSEC
Cisco-IDS: Collects IDS events from Cisco IDS using SDEE
File Collector: Collects files using FTP, SFTP, and File Copy and processes the data from the files
Database Collector: Collects events from various products that use a database backend, such as Snort and ISS Site Protector
Correlation Engine: Uses user defined flowchart driven rules to control the flow of events which can be logged and/or alerted on
Schedule Engine: Module that runs scheduled tasks
Audit Logger: Module that will collect, store, and index events in raw and/or parsed form
Audit Logger Extension: Module that will collect Audit Logger Data working with the Audit Logger module to index and query the data definitions
Asset: Any device that will be monitored by the Activeworx application
Manager: A general purpose program that will run one or more modules and is the main access point for all activity
Collector/Module: A collector/module is a component within the Activeworx manager
Event(s): Data that is captured by a collector
Audit Logger: Activeworx log management system FIG. 11 provides an example of a screen shot from Activeworx that depicts an analysis of security event relationships within a network computer system. An event relationship diagram helps in the monitoring of security events and alerts by displaying security-related events and the relationship between them. Once these security events are displayed, an analyst can replay the order in which they occurred or drill down into the events to obtain additional information.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the following reference illustrates different examples of components that can be used for a computer network security apparatus: Appendix A of the U.S. Application Ser. No. 61/119,488, (entitled "Remote Network Security Systems and Methods" and filed on Dec. 3, 2008), of which the entire disclosure (including any and all figures) is incorporated herein by reference. Additionally, it should be understood that the components may be deployed at a company's site in a self-contained unit (e.g., a box) or deployed in another type of arrangement, such as by placing different components (e.g., storage device(s) and virtual server(s)) in separate units that allow for data communication between the units.

Figure 12:
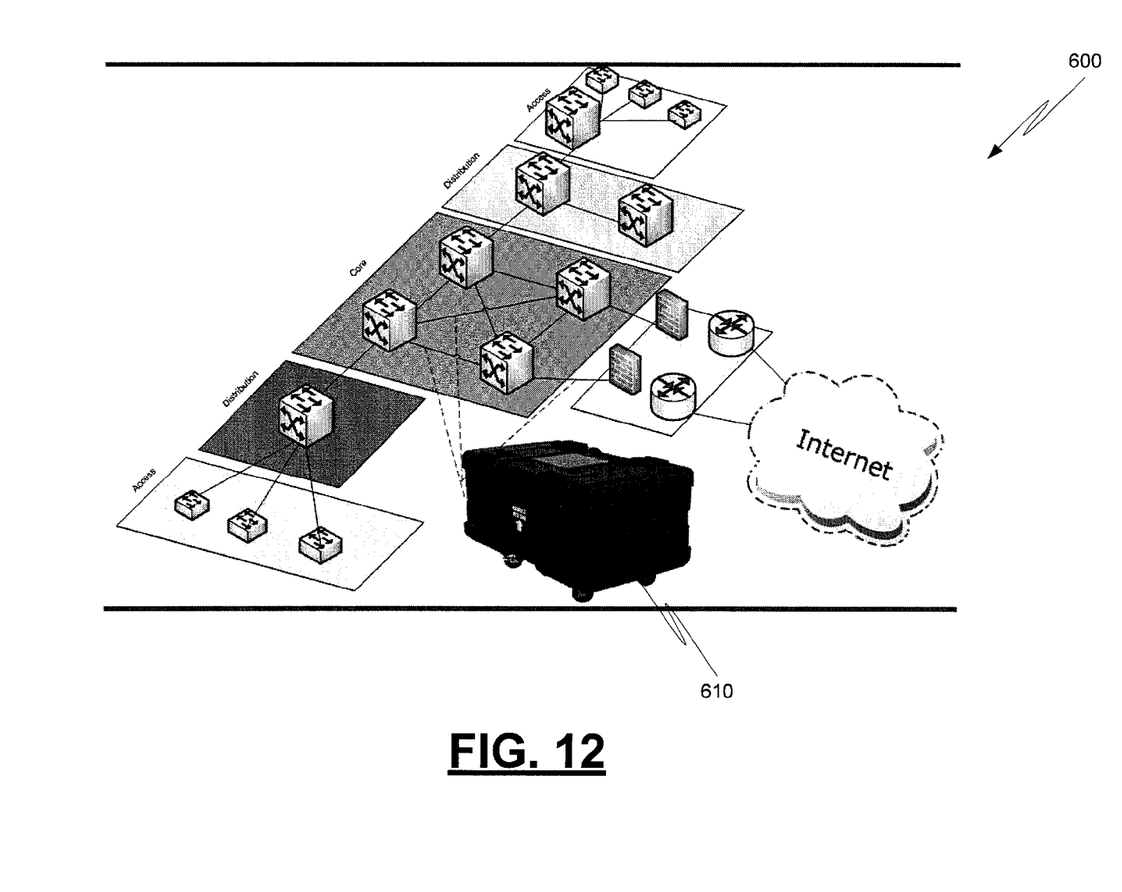
FIG. 12 is a block diagram depicting connection points involving a deployed box.

As another example of the wide scope of the systems and methods disclosed herein, the system can be deployed out of band on external span ports from within the customer's organization. Strategic network placement are determined once network diagrams and/or discussions with internal IT staff are reviewed. FIG. 12 depicts at 600 an example of a box 610 being deployed with spanned connections from all choke points to the Internet in a sample environment.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device (e.g., a box).

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. An apparatus, comprising:
one or more computer network interfaces to:
acquire data related to a computer networked environment, and
send information to, and receive information from, a remote location that is external to the apparatus, the remote location including a library of security-related software programs;
a computer-readable storage medium to store information regarding a virtualization environment,
wherein the information regarding the virtualization environment includes information regarding a configuration of a first set of network security data collector programs,
wherein a particular network security data collector program, of the first set of network security data collector programs, generates computer network security analysis data based on the acquired data; and
one or more data processors upon which the virtualization environment and the one or more network security data collector programs execute;
wherein the virtualization environment facilitates downloading from the remote location of a second set of network security data collector programs, the second set of network security data collector programs being different from the first set of network security data collector programs,
wherein the second set of network security data collector programs includes one or more of the security-related software programs from the library;
wherein downloading the second set of network security data collector programs allows different computer network security analysis data, related to the computer networked environment, to be generated by the second set of network security data collector programs and stored in the computer-readable storage medium,
wherein downloading the second set of network security data collector programs occurs based on an identification of a new security threat to the computer networked environment, wherein the one or more of the security-related software programs are selected based on the new security threat;
the apparatus further comprising software instructions for execution upon the one or more data processors for detecting a fault condition with respect to a blade containing a particular virtual machine that is configured to perform one or more computer network security operations with respect to the computer networked environment,
wherein upon detection of a fault condition, the virtual machine is transferred to another blade within the apparatus, and
wherein the transferring of the virtual machine allows the virtual machine to continue to operate in a degraded performance mode.

2. The apparatus of claim 1, further comprising:
a self-contained physical unit that contains the one or more computer network interfaces, the computer-readable storage medium, and the one or more data processors.

3. The apparatus of claim 1, wherein the first set of network security data collector programs includes at least one of:
an intrusion detection program,
a vulnerability assessment program,
a network attack/penetration testing systems program,
a network traffic pattern behavior analysis program,
a network traffic/packet capture with session reconstruction and playback program,
a malware analysis program, or
a remote forensics program.

4. The apparatus of claim 1, wherein downloading the second set of network security data collector programs includes receiving, from the remote location, an instruction to remove one or more security-related software programs, associated with the configuration, from the computer-readable storage medium.

5. The apparatus of claim 4, wherein the one or more security-related software programs are removed in order to decrease security operating cost for a company at whose site the apparatus is deployed.

6. The apparatus of claim 1, wherein the one or more computer network interfaces include interfaces to a plurality of networks;
wherein a first network, of the plurality of networks, is for receiving and routing client span/tap traffic;
wherein a second network, of the plurality of networks, is a private management network that allows intra-virtual machine ("VM") communication and communication between other devices; and wherein a third network, of the plurality of networks, is a network for connection to the client site for scanning and testing and external connectivity.

7. The apparatus of claim 1, wherein the virtualization environment comprises a cluster of virtual servers and a network attached storage device.

8. The apparatus of claim 1, wherein the computer-readable storage medium stores a configuration of one or more analytic engines;
wherein the one or more analytic engines execute upon the one or more data processors in order to perform data fusion with respect to the computer network security analysis data that is generated by two or more network security data collector programs.

9. The apparatus of claim 8, wherein the one or more analytic engines and the two or more network security data collector programs generate security-related analysis data that is sent to the remote location for security-related analysis.

10. The apparatus of claim 9, wherein the security-related analysis data that is generated by the one or more analytic engines and the two or more network security data collector programs are displayed on computer graphical user interfaces at the remote location for the security-related analysis.

11. The apparatus of claim 10, wherein a network communication is terminated by the remote location in response to the security-related analysis data that is generated by the one or more analytic engines or the two or more network security data collector programs.

12. The apparatus of claim 8, wherein a network communication is automatically terminated by a program operating within the virtualization environment in response to the security-related analysis data that is generated by the one or more analytic engines or the two or more network security data collector programs.

13. The apparatus of claim 12, wherein the program operating within the virtualization environment further sends a security-related threat notification to the remote location in response to the security-related analysis data that is generated by the one or more analytic engines and the two or more network security data collector programs.

14. The apparatus of claim 1, wherein the one or more computer network interfaces are configured to automatically connect to the remote location after initial deployment of the apparatus;
wherein the one or more computer network interfaces are configured to receive data, from the remote location, that allows the remote location to remotely manage one or more virtual machines that operate within the virtualization environment.

15. A method, comprising:
acquiring, by one or more processors of a security device, data that is related to a computer networked environment;
storing, on a computer-readable storage medium associated with the security device, a virtualization environment that includes a configuration of a first set of network security data collector programs;
generating, by the one or more processors of the security device, via the one or more network security data collector programs of the first set of network security data collector programs, computer network security analysis data, the computer network security analysis data being based on the acquired data that is related to the computer networked environment, wherein the generated computer security analysis data indicates a security threat;
sending, by the one or more processors of the security device, the generated computer network security analysis data to a remote device, the remote device being physically separate from the security device;
receiving, based on the sent computer network security analysis data, by the security device, and from the remote device, a second set of network security data collector programs, the second set of network security data collector programs being different from the first set of network security data collector programs, wherein the second set of network security data collector programs are selected based on an identification of the security threat;
replacing, by the security device, the first set of network security data collector programs with the second set of network security data collector programs;
acquiring, after replacing the first set of network security data collector programs and by the security device, additional data related to the computer networked environment;
generating, by the one or more processors of the security device, via the second set of network security data collector programs, additional computer network security analysis data, the additional computer network security analysis data being based on the additional acquired data that is related to the computer networked environment;
detecting a fault condition with respect to a blade, of a particular apparatus comprising a plurality of blades, containing a particular virtual machine that is configured to perform one or more computer network security operations with respect to the computer networked environment; and
transferring, based on detecting the fault condition, the particular virtual machine to another blade of the particular apparatus,
wherein the transferring of the virtual machine allows the virtual machine to continue to operate in a degraded performance mode.

16. The method of claim 15, wherein acquiring the data includes performing a full traffic capture of data sent and received by the computer networked environment.

17. A non-transitory computer-readable medium, comprising:
a plurality of computer-executable instructions that, when executed by one or more processors of a security device, cause the one or more processors to:
acquire data that is related to a computer networked environment;
store a virtualization environment that includes a first configuration of a first set of network security data collector programs;
generate, via the one or more network security data collector programs of the first set of network security data collector programs, computer network security analysis data, the computer network security analysis data being based on the acquired data that is related to the computer networked environment, wherein the generated computer security analysis data indicates a security threat;
send the generated computer network security analysis data to a remote device, the remote device being physically separate from the security device;
receive, based on the sent computer network security analysis data, from the remote device, a second set of network security data collector programs, the second set of network security data collector programs being different from the first set of network security data collector programs, wherein the second set of network security data collector programs are selected based on an identification of the security threat;

generate, via the second set of network security data collector programs, additional computer network security analysis data related to the computer networked environment;

detect a fault condition with respect to a blade, of a particular apparatus comprising a plurality of blades, containing a particular virtual machine that is configured to perform one or more computer network security operations with respect to the computer networked environment; and transfer, based on detecting the fault condition, the particular virtual machine to another blade of the particular apparatus, wherein the transferring of the virtual machine allows the virtual machine to continue to operate in a degraded performance mode.

* * * * *